US009653899B2

(12) United States Patent
Salian et al.

(10) Patent No.: US 9,653,899 B2
(45) Date of Patent: May 16, 2017

(54) FLOOR STAND SYSTEM FOR MOUNTING AN ELECTRICAL BOX

(71) Applicant: Cooper Technologies Company, Houston, TX (US)

(72) Inventors: Jayanth Koragappa Salian, Karnataka (IN); Shainish Nellikka, Karnataka (IN)

(73) Assignee: Cooper Technologies Company, Houston, TX (US)

( * ) Notice: Subject to any disclaimer, the term of this patent is extended or adjusted under 35 U.S.C. 154(b) by 771 days.

(21) Appl. No.: 13/839,458

(22) Filed: Mar. 15, 2013

(65) Prior Publication Data

US 2014/0263865 A1    Sep. 18, 2014

(51) Int. Cl.
*H02G 3/12*  (2006.01)
*F16B 5/00*  (2006.01)
*H02G 1/00*  (2006.01)

(52) U.S. Cl.
CPC ........... *H02G 3/121* (2013.01); *F16B 5/0016* (2013.01); *H02G 1/00* (2013.01); *H02G 3/12* (2013.01); *H02G 3/123* (2013.01); *Y10T 29/49826* (2015.01); *Y10T 403/7045* (2015.01)

(58) Field of Classification Search
CPC ........ H02G 3/125; H02G 3/123; H02G 3/121; H02G 3/12; F16B 5/0016; F16B 5/0012; F16B 5/0008
See application file for complete search history.

(56) References Cited

U.S. PATENT DOCUMENTS

| 1,774,934 | A | * | 9/1930 | Mangin | H02G 3/125 220/3.9 |
| 2,990,172 | A | * | 6/1961 | Gianotta | H02G 3/125 269/152 |
| 3,424,332 | A | * | 1/1969 | Pimentel | H02G 3/123 174/58 |
| 3,424,333 | A | * | 1/1969 | Pimentel | H02G 3/123 174/58 |
| 3,575,313 | A | * | 4/1971 | Trachtenberg | H02G 3/123 174/58 |
| 5,098,046 | A | | 3/1992 | Webb | |
| 5,224,673 | A | | 7/1993 | Webb | |
| 5,288,041 | A | | 2/1994 | Webb | |
| 6,384,334 | B1 | | 5/2002 | Webb | |

(Continued)

FOREIGN PATENT DOCUMENTS

WO    WO 2010008778    *    1/2010    ............. H05K 13/04

*Primary Examiner* — Michael Safavi
(74) *Attorney, Agent, or Firm* — Senniger Powers LLP

(57) ABSTRACT

A floor stand system for mounting an electrical box above a floor includes an electrical box mount having a mechanical interface thereon. A set of substantially interchangeable floor supports have mating mechanical interfaces at their upper ends for connecting to the mechanical interface on the electrical box mount. The set of floor supports includes a plurality of floor supports having different fixed lengths. The floor supports are substantially interchangeable so that one of the floor supports having a fixed length suitable for supporting the electrical box mount at a desired elevation above the floor can be selected and connected to the electrical box mount using the mechanical interfaces to create a floor stand suitable for supporting the electrical box mount at the desired elevation above the floor.

11 Claims, 18 Drawing Sheets

(56) References Cited

U.S. PATENT DOCUMENTS

| | | |
|---|---|---|
| 6,590,155 B2 | 7/2003 | Vrame et al. |
| 6,803,521 B2 * | 10/2004 | Vrame .................... H02G 3/123 174/50 |
| 6,871,827 B2 | 3/2005 | Petak et al. |
| 6,996,943 B2 | 2/2006 | Denier et al. |
| 7,053,300 B2 | 5/2006 | Denier et al. |
| 7,271,335 B2 | 9/2007 | Dinh |
| 7,271,336 B2 | 9/2007 | Dinh |
| 7,956,285 B2 | 6/2011 | Tally et al. |
| 2007/0181330 A1 * | 8/2007 | Dinh ...................... H02G 3/125 174/58 |
| 2008/0020632 A1 * | 1/2008 | Gorman ................. H02G 3/125 439/535 |
| 2010/0006723 A1 * | 1/2010 | Yan ........................ H02G 3/125 248/201 |
| 2010/0176138 A1 * | 7/2010 | Zacharevitz ............. H02G 1/00 220/737 |
| 2013/0140415 A1 * | 6/2013 | Nuernberger .......... H02G 3/125 248/214 |

* cited by examiner

FLOOR STAND SYSTEM FOR MOUNTING AN ELECTRICAL BOX

FIELD OF THE INVENTION

The present invention generally relates to electrical box mounting devices and, more particularly, to systems for mounting an electrical box in a wall using the floor and/or a stud in the wall at the floor to support the electrical box above the floor.

BACKGROUND OF THE INVENTION

Electrical (junction) boxes are mounted in walls in various ways by different types of brackets. One type of bracket, commonly referred to as a floor stand, is used for mounting an electrical box in a wall where the box is too far from an adjacent wall stud to use a conventional stud-mounted bracket. Also, even if the mounting location is not too far from the adjacent stud, the studs in modern walls can be made of various materials (e.g., wood and metal) and floor stands may be desirable so there is no need to worry about whether or not a particular stud-mounted bracket will be suitable for use with the particular stud in the wall for any specific installation. A floor stand typically uses the floor and/or a horizontal bottom board or plate in the frame for the wall at the floor to support the electrical box above the floor. Some floor stands do not rely at all on the vertical studs in the wall for support. Others may have arms that can be extended to connect to a vertical stud to provide additional stabilizing support in addition to the support from the floor and/or bottom of the wall frame.

One particular type of floor stand is fabricated from sheet metal and is designed for attachment at its lower end to a horizontal floor stud. The bracket extends vertically up from the floor and/or the bottom of the wall frame at the floor and has an electrical box mounting section adjacent its upper end to which an electrical box is fastened. After the bracket and electrical box are installed, the wall is completed by securing appropriate sections of dry wall to the studs. Reference may be made to U.S. Pat. Nos. 5,288,041 and 7,956,285 for examples of such brackets.

Construction plans commonly require electrical boxes to be mounted at various different heights above the floor. One way to address the need to mount electrical boxes at different heights is for workers who install the electrical boxes to carry a plurality of different floor stand models, each having a different height, so a floor stand of the correct height can be used to mount the electrical box at the required height. However, it is more complicated to manufacture multiple different floor stand models and there are added costs associated with tracking inventory of several different floor stand models. It is also possible that the particular model of floor stand needed to install a particular electrical box at the required height might be out-of-stock, even if just locally at the job site, unless inventory requirements and depletion rates are carefully managed.

One solution to this inventory problem is to use floor stands that have a telescoping action so a single model of floor stand can be used to mount an electrical box at any height within a suitable range of heights. This avoids the need to carry and manage an inventory that has multiple different models just to provide the capability to mount the electrical boxes at the different heights. However, telescoping floor stands require overlapping different segments of the floor stand with one another. Thus, more material is generally required to make a telescoping floor stand than a non-telescoping floor stand. When telescoping floor stands are used in a relatively shorter configuration to mount an electrical box at a relatively low height about the floor, the inefficient use of material is particularly pronounced because of the substantial extent the telescoping segments are overlapped in the shorter configuration.

None of the conventional floor stands have satisfactorily addressed these issues.

SUMMARY

One aspect of the invention is a floor stand system for mounting an electrical box above a floor. The system includes an electrical box mount for supporting one or more electrical boxes. The electrical box mount has a mechanical interface thereon. The system also includes a set of substantially interchangeable floor supports. Each floor support has a mating mechanical interface at an upper end of the floor support. Each mating mechanical interface is adapted to connect to the mechanical interface on the electrical box mount to secure the electrical box mount to the respective floor support. The set of floor supports includes a plurality of floor supports having different fixed lengths for supporting the electrical box mount at different elevations above the floor. The floor supports are substantially interchangeable so that one of the floor supports having a fixed length suitable for supporting the electrical box mount at a desired elevation above the floor can be selected and connected to the electrical box mount using the mechanical interface on the electrical box mount and the mating mechanical interface on the selected floor support for supporting the electrical box mount at the desired elevation above the floor.

Another aspect of the invention is a method of supporting an electrical box at a desired elevation above a floor. The method includes selecting one floor support have a length suitable for supporting the electrical box at the desired elevation from a set comprising a plurality of floor supports having a plurality of different lengths. The selected floor support is connected to an electrical box mount having an opening for receiving the electrical box. The selected floor support is used to support the electrical box mount so the opening for the electrical box is at the desired elevation above the floor.

Still another aspect of the invention is a mechanical interface on a floor stand component for connecting the floor stand components to a second floor stand component without requiring any tools. The mechanical interface includes a body at the end of the component. A plurality of fingers have bases secured to the body and free ends offset from the body. The fingers and body being configured so they define a channel for receiving an edge of the second floor stand component. The free ends of the fingers and body are on opposite sides of the other second stand component when the second floor stand component is received in the channel. The interface has a locking tab. A base of the locking tab is secured to the body. A free end of the locking tab is offset from the body in the same direction as the free ends of the fingers. The locking tab extends from a position relatively farther from the base of the channel toward the base of the channel. The interface includes a pair of stops secured to the body and extending laterally from the body. Each stop has a surface oriented angularly relative to the body for abutting against a surface on the second floor stand component to limit movement of the electrical box mount and component toward one another after the end of the second component is received in the channel. The interface has a tongue at the end of the interface between the stops and extending away from the bottom of the channel. The tongue is substantially co-planar with the body.

Other objects and features will be in part apparent and in part pointed out hereinafter.

BRIEF DESCRIPTION OF DRAWINGS

Corresponding reference characters indicate corresponding parts throughout the drawings.

DETAILED DESCRIPTION

Figure 1:
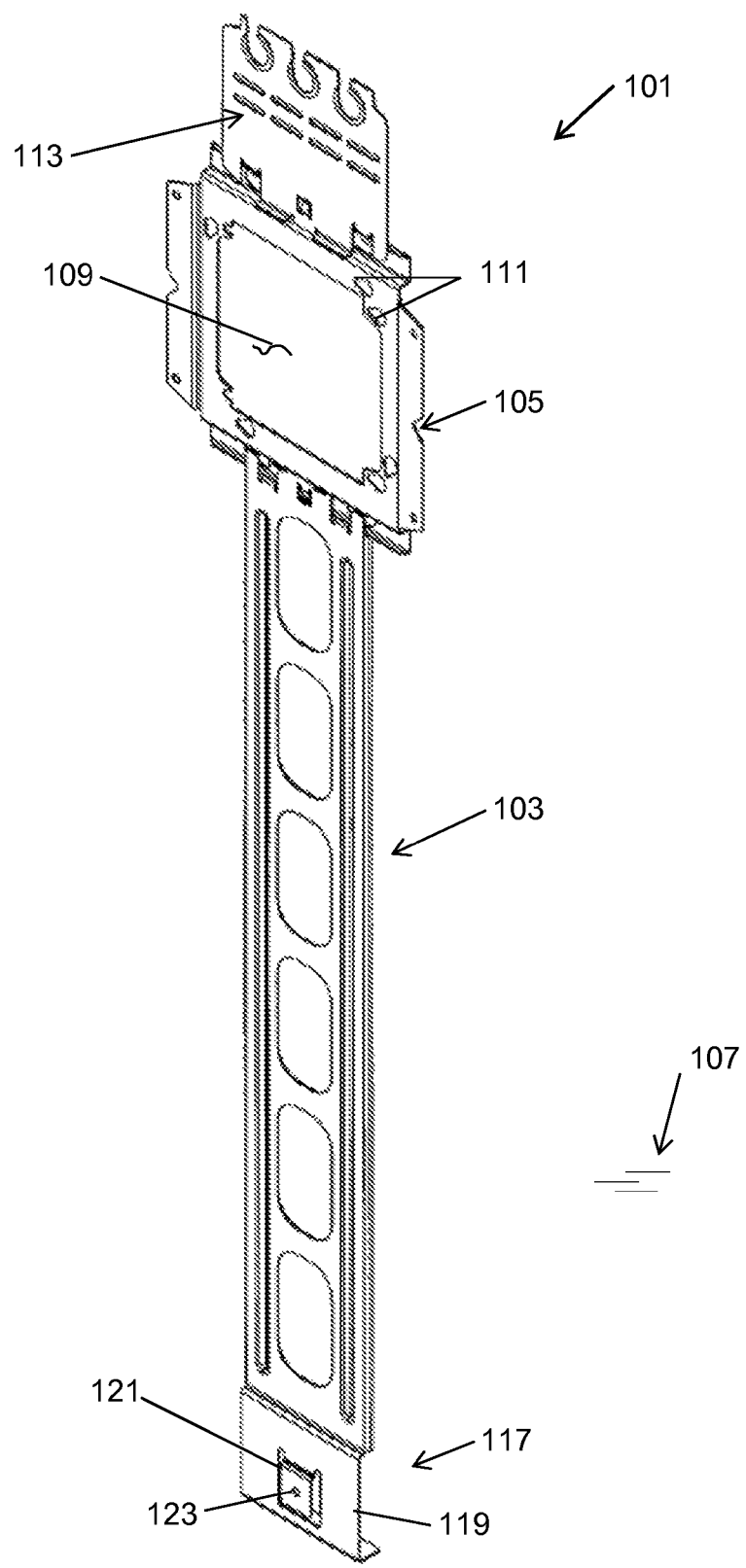
FIG. 1 is a perspective of one embodiment of a floor support system for mounting an electrical box in a wall.
Figure 2:
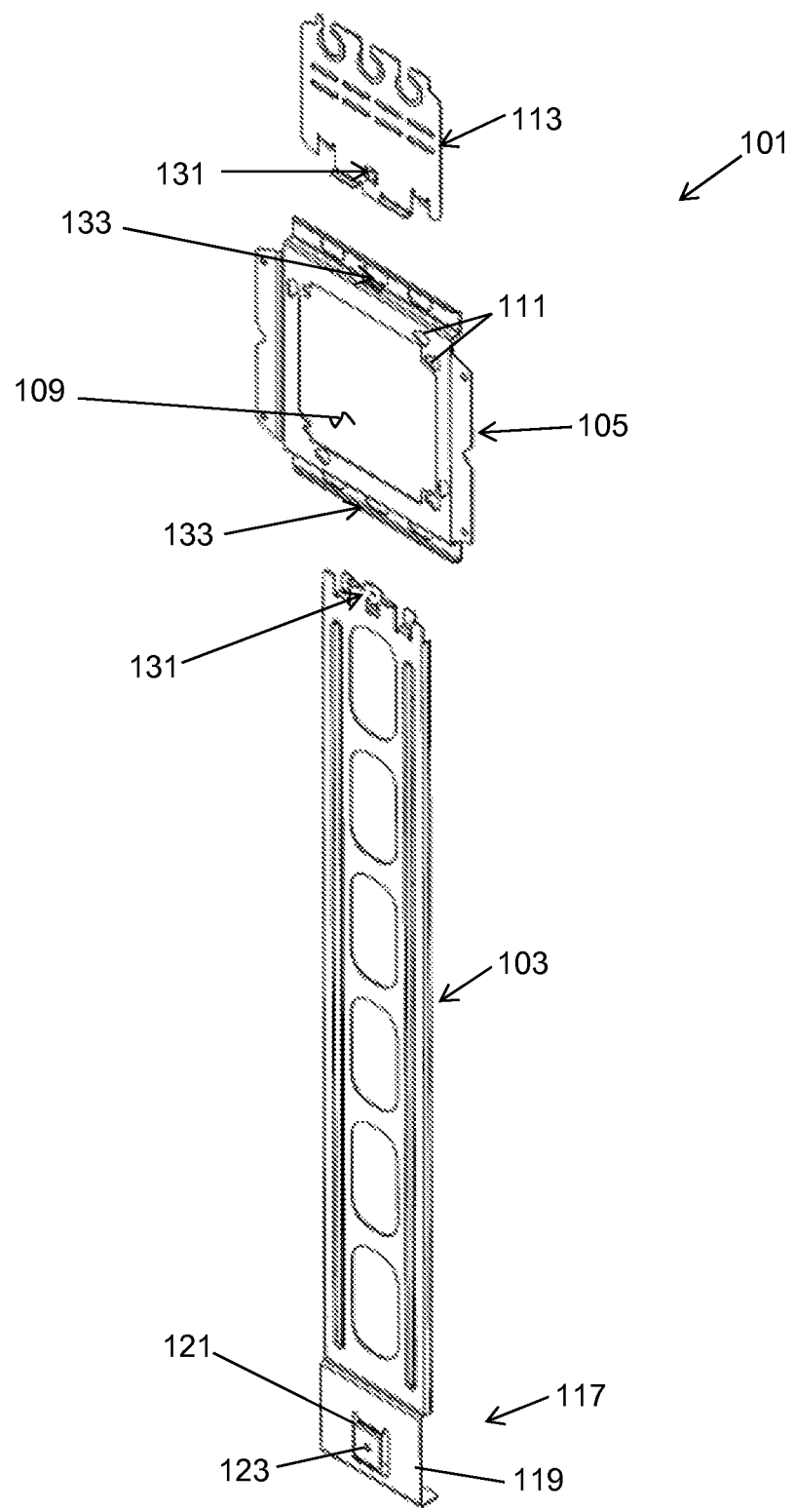
FIG. 2 is an exploded perspective of the floor support system illustrated in FIG. 1.

Referring now to the drawings, and first to FIGS. 1-2, one embodiment of a floor support system for mounting an electrical box in a wall is generally designated 101. The floor support system 101 includes a plurality of components that are adapted to be connected to one another to form a floor stand. For example, the system 101 suitably includes a floor support 103 adapted to be connected to an electrical box mount 105 so the floor support can support the electrical box mount above the floor. In the illustrated embodiment, the system 101 also includes a cable guide 113 that can be connected to the electrical box mount 105 so it extends from the electrical box mount for supporting one or more cables extending from the electrical box at a position spaced from the box. For example, the cable guide 113 can be connected to the electrical box mount 105 on an edge (e.g., an upper edge) of the electrical box mount opposite the floor support and bent so openings in the cable guide are oriented to support one or more cables extending from the electrical box. The basic operation of a cable guide in a floor stand is generally known to those skilled in the art and there is no need for a detailed explanation herein.

The floor support 103 is suitably a generally elongate structure that can be oriented to extend upright within a wall from a base 117 at the floor 107 and/or a base of the wall frame at the floor to the electrical box mount 105. As illustrated, the base 117 has a bracket 119 for connection to a traditional wooden board (not shown) at the bottom of the wall frame at the floor and a clip 121 arranged to fit over a front flange of a metallic frame element at the bottom of the wall frame. There is an opening 123 in the clip 121 for receiving a screw or other fastener (not shown) that may be used to secure the base 117 of the floor support 103 to the bottom of the wall frame. Those skilled in the art will recognize there are many different ways to secure the base of a floor stand to the bottom of a wall frame at the floor and any of them can be used with the floor support of the floor support system within the broad scope of the invention.

The electrical box mount 105 has an opening 109 for receiving an electrical box (not shown) and is adapted to support the electrical box when it is received in the opening 109. The particular connection between the electrical box mount 105 and the electrical box can vary within the broad scope of the invention. As illustrated in the drawings, the electrical box mount 105 is a plate that includes a plurality of openings 111 at various positions around the opening 109 for the electrical box for connecting the electrical box and/or a mud ring (not shown) to the box support. Different subsets of the openings 111 can be used to allow the electrical box mount 105 to be used with any of various possible electrical boxes that may be encountered in a particular electrical box installation. The various ways an electrical box and/or mud ring can be connected to the electrical box mount 105 are known to those skilled in the art and there is no need for a detailed explanation herein.

One embodiment of a pair of mating mechanical interfaces, generally designated 131 and 133, for connecting the components of the floor support system to one another is illustrated in FIGS. 3-7. The interfaces 131, 133 are suitably formed integrally with the rest of their respective floor stand component. The interfaces 131, 133 facilitate establishing a quick, easy, and reliably-secure connection between the various components of the system 101 without requiring use of any tools in the field. In the illustrated embodiment, the floor support 103 has an interface 131 on its upper end for connecting to a mating interface 133 on the electrical box mount 105. The cable guide 113 also has an interface 131 on its lower end for connecting to a mating interface 133 of the electrical box mount 105. The electrical box mount 105 has two mating interfaces 133 on opposite edges (e.g., an upper edge and a lower edge).

Because the electrical box mount 105 has identical interfaces 133 at opposite edges, the orientation of the electrical box mount 105 may be inverted without affecting the ability to connect either the floor support 103 to the "lower" end of the electrical box mount or connect the cable guide 113 to the "upper" end of the electrical box mount. The ability to invert the electrical box mount 105 may facilitate use of the electrical box mount with a particular electrical box without requiring the orientation of the electrical box to be inverted in order to use a particular subset of the openings 111 that are used to connect the electrical box to the electrical box mount. It is understood the interfaces 133 on the opposite ends of the electrical box mount 105 can be replaced with the interfaces 131 and that the interfaces 131 on the ends of the floor support 103 and cable guide 113 can be replaced with interfaces 131 while still maintaining the ability to use the electrical box mount 105 in the illustrated orientation or in an inverted orientation. It is also understood the positions of any of the mating interfaces 131, 133 in one of the interface pairs of the illustrated embodiment can be reversed independently of the other interface pair without departing from the broad scope of the invention.

As illustrated, the mechanical interfaces 131 on the floor support 103 and on the cable guide 113 are substantially identical and a detailed description of one will suffice for both. However, it is understood the interfaces on the floor support and cable guide can differ from one another within the scope of the invention. Moreover, it is understood that interfaces other than interface 131 can interface with interface 133 without departing from the scope of the invention. Likewise, it is understood interfaces other than interface 133 can interface with interface 131 within the scope of the invention.

Figure 3:
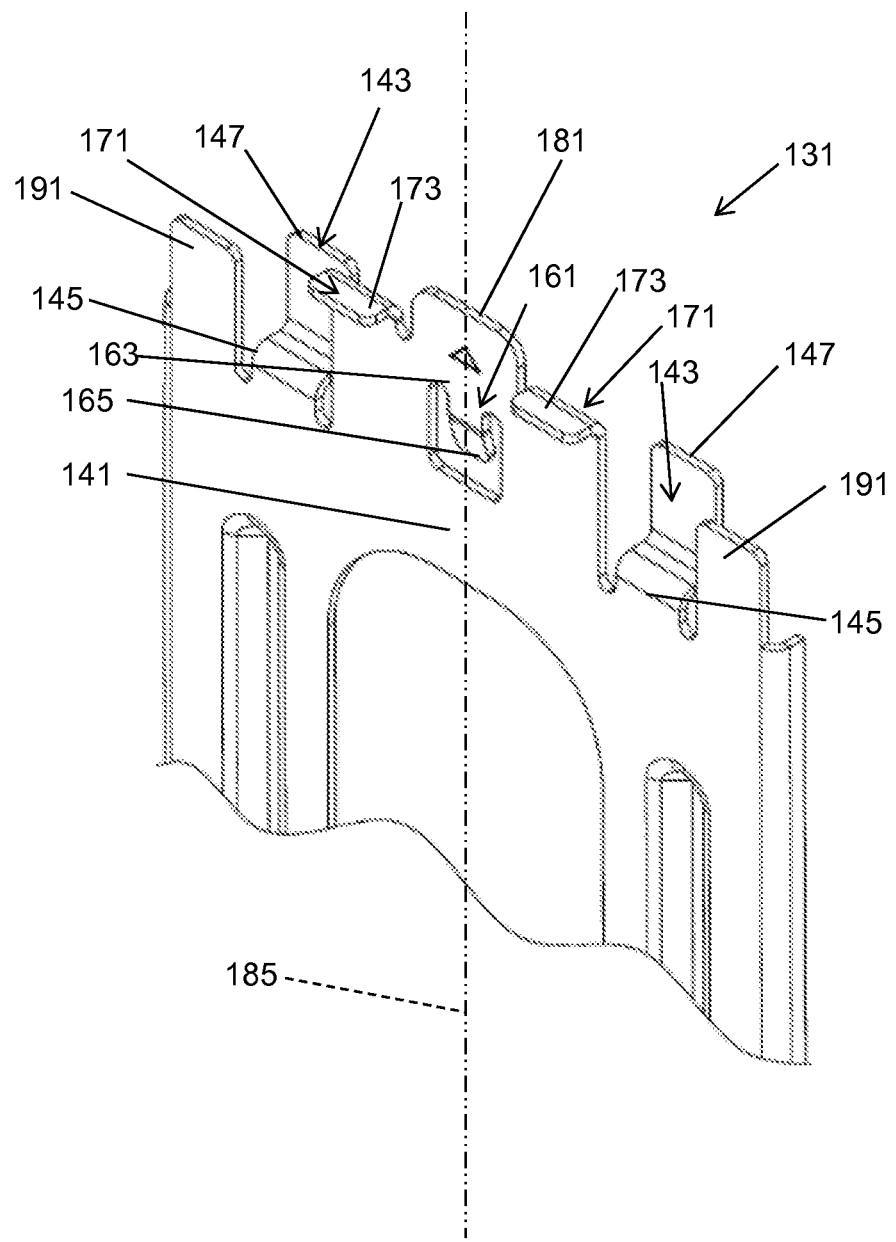
FIG. 3 is an enlarged fragmentary perspective of an end of a floor support showing one embodiment of mechanical interface for connecting components of the floor support system to one another.
Figure 4:
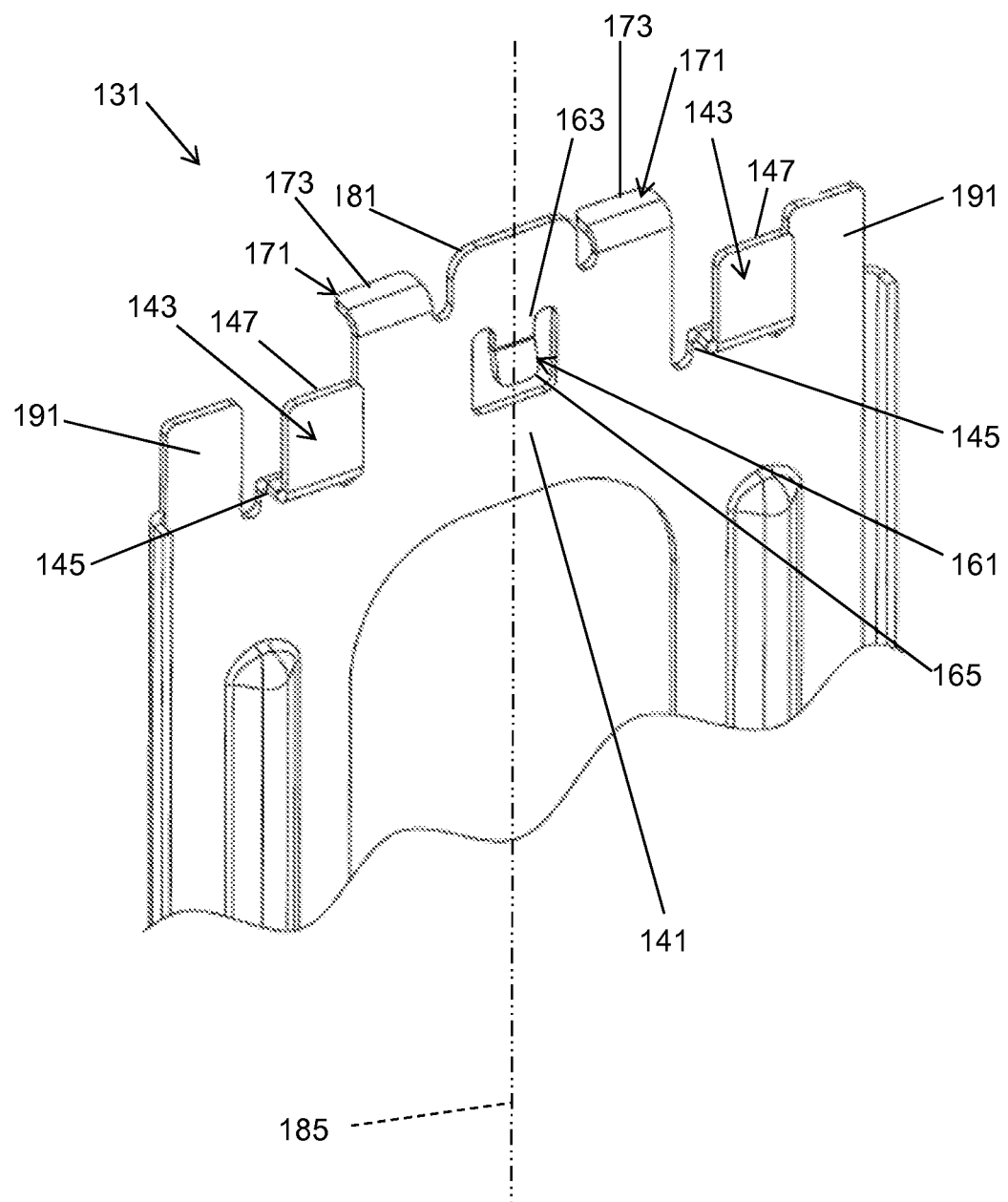
FIG. 4 is another enlarged fragmentary perspective of the mechanical illustrated in FIG. 3 from a different vantage point.
Figure 5:
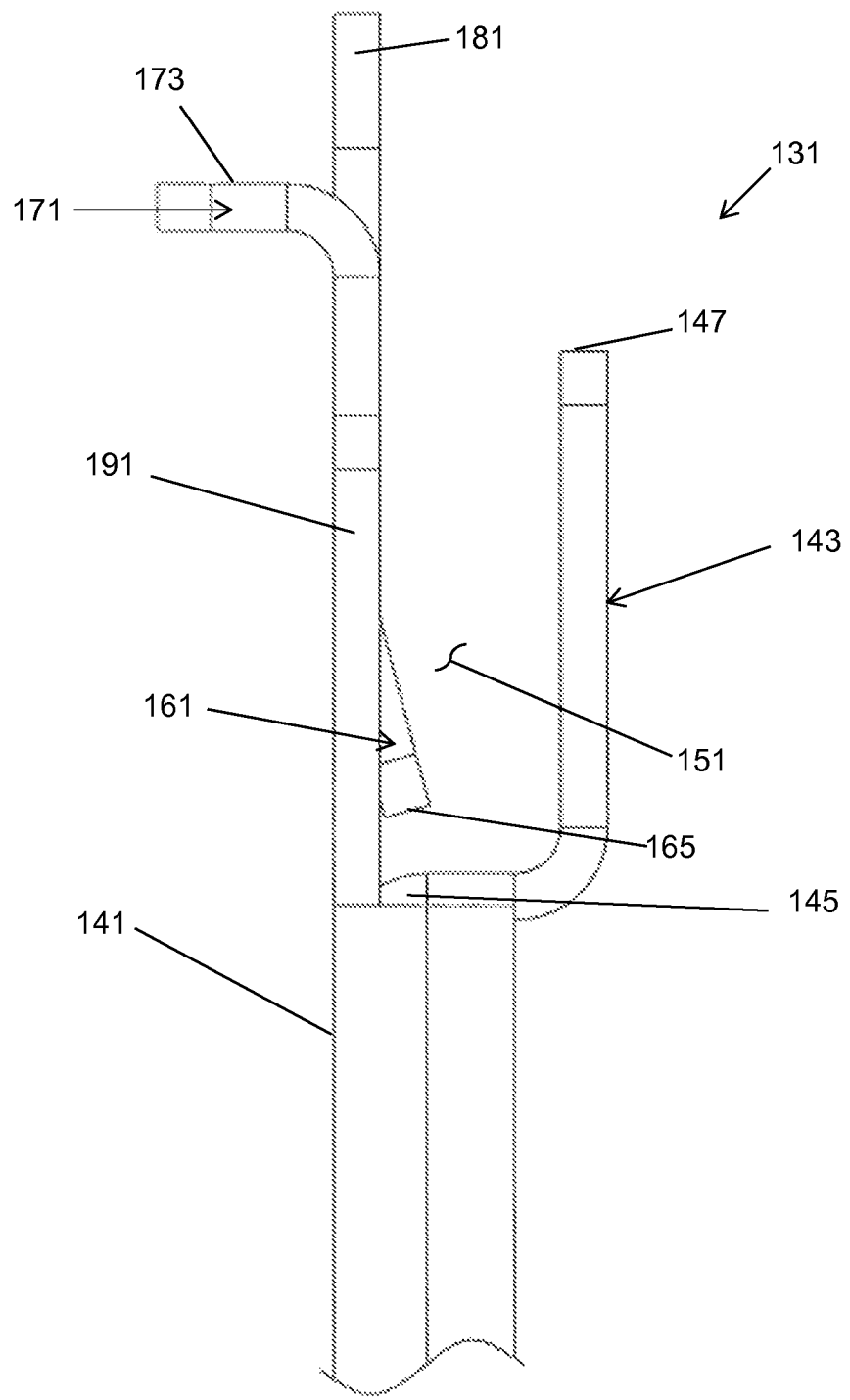
FIG. 5 is an enlarged fragmentary side elevation of the end of the floor support shown in FIGS. 3-4.

Referring to FIGS. 3-5, the interface 131 includes a body 141 at the end of the floor support 103, cable guide 113 (or other component). The body 141 is suitably a substantially flat piece of metal. The body 141 is suitably co-planar with the main body of the rest of the floor support 105, cable guide 113, or other floor support system component. A plurality of fingers 143 are secured to the body 141 at their bases 145. Free ends 147 of the fingers 143 are offset from the body 141. The fingers 143 and body 141 define a laterally-extending channel 151 (FIG. 5) for receiving an end 211 of the mating interface 133 so the free ends 147 of the fingers and the body 141 are on opposite sides of the other interface 133 when the end 211 of the other interface is received in the channel. There are two fingers 143 spaced apart laterally from one another in the illustrated embodiment. However, the number of fingers can vary within the scope of the invention.

The interface 131 suitably also includes a pair of stops 171 secured to the body 141 and extending laterally from the body. Each stop 171 has a surface 173 oriented angularly relative to the body 141 for abutting against a surface on the mating interface 133 to limit movement of the interfaces 131, 133 toward one another after they are connected. In the illustrated embodiment, there are two stops 171 but the number of stops can vary within the scope of the invention. Each of the two stops 171 in the illustrated embodiment is positioned between the outermost fingers 143. For example, the stops 171 are each positioned between the two fingers 143 in the illustrated embodiment. However, it is possible one, or more, or all of the stops are positioned between the outermost finger 143 and the side edge margin of the interface within the scope of the invention. In the illustrated embodiment, the stops 171 extend substantially orthogonally relative to the body 141 and the surfaces 173 are substantially perpendicular to the body.

The interface 131 also includes a tongue 181 at the end of the interface. The tongue 181 is suitably co-planar with the body 141. As illustrated, the tongue 181 extends farther above the bottom of the channel 151 than any other part of the interface 131. The tongue 181 in the illustrated embodiment is positioned between the stops 171. The tongue 181 is also suitably positioned between the fingers 143. For example, in the illustrated embodiment, the tongue 181 is positioned on a central vertical axis 185 of the interface 131 and of the floor support 103, cable guide 113 or other component.

As illustrated in FIGS. 3 and 4, the interface suitably also has a pair of tabs 191 at opposite side margins of the interface. Each of the tabs 191 is suitably positioned laterally outward of and adjacent to a corresponding one of the fingers 143. As illustrated, the tabs 191 are substantially co-planar with the tongue 181 and the rest of the body 141 at the end of the interface 131.

The interface 131 has a locking tab 161 adapted to retain the interfaces 131, 133 in mating engagement once they have been connected to one another. As illustrated, the locking tab 161 has a base 163 secured to the body 141 of the interface 131 and a free end 165 that is offset from the body in the same direction as the free ends 147 of the fingers 143. The locking tab 161 suitably extends from a position relatively farther from the base of the channel 151 toward the base of the channel. Accordingly, the locking tab 161 is angled back away from the other interface 133 and the free end 165 of the locking tab extends into the channel 151 when the interfaces 131, 133 are connected.

The locking tab 161 is suitably resiliently deformable so the free end 165 of the locking tab can be temporarily pushed out of the channel 151 by the mating interface 133 when the end 211 of the mating interface 133 is inserted into the channel during connection of the interfaces 131, 133. The locking tab 161 has sufficient resilience to spring back toward its original position after an opening 167 on the mating interface 133 is aligned with the free end 165 of the locking tab so the end 165 of the locking tab extends into the opening, and also into the channel 151, when the interfaces 131, 133 are connected to one another. Although there is a single locking tab 161 on the illustrated interface 131, the interface can include additional locking tabs within the scope of the invention. The locking tab 161 is suitably positioned on the central axis 185 of the interface 131 between the tongue 181 and the bottom of the channel 151.

Figure 6:
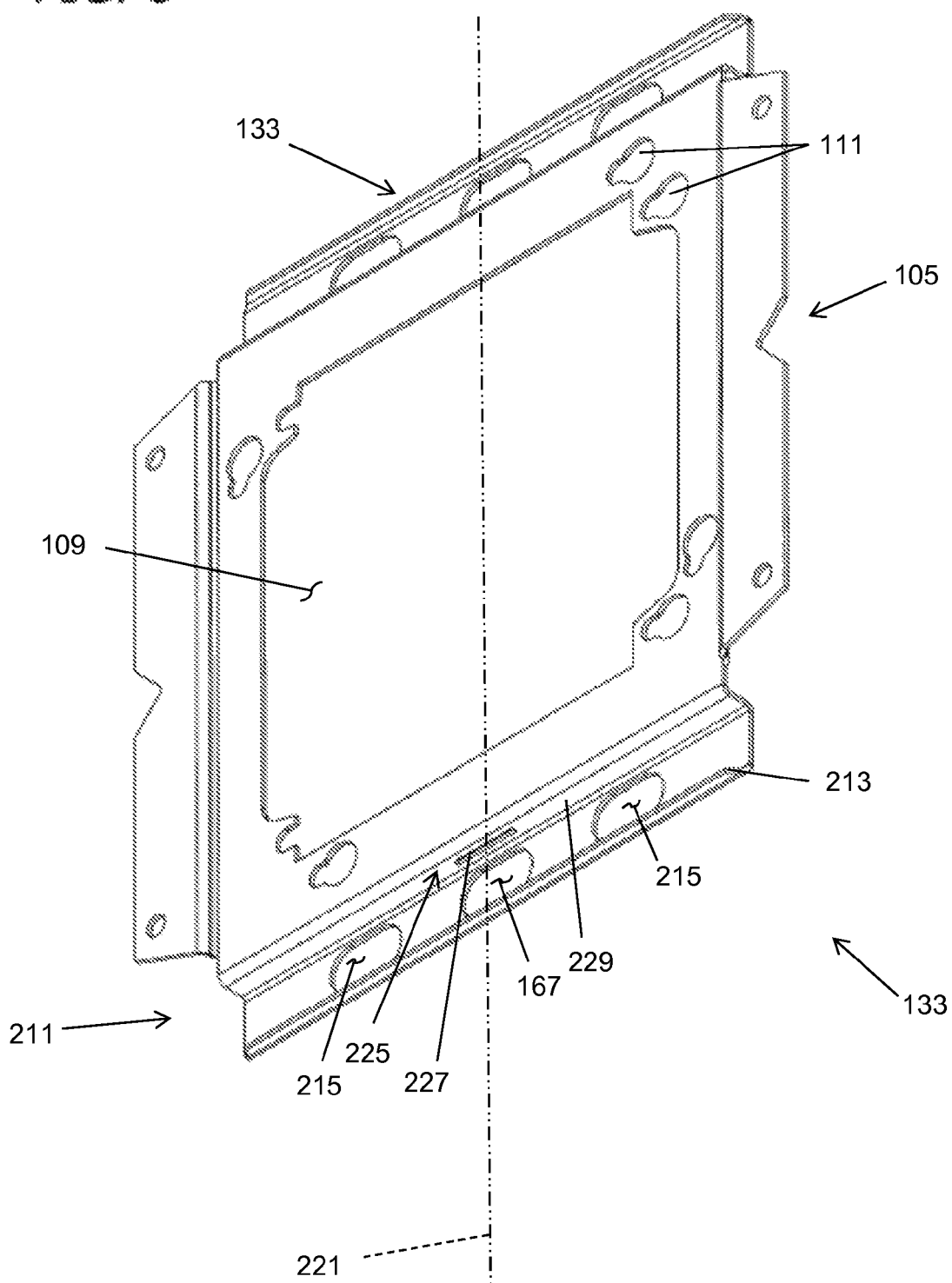
FIG. 6 is an enlarged fragmentary perspective of one embodiment of an electrical box mount illustrating one embodiment of a mechanical interface adapted for connection with the mechanical interface illustrated in FIGS. 3-5.
Figure 7:
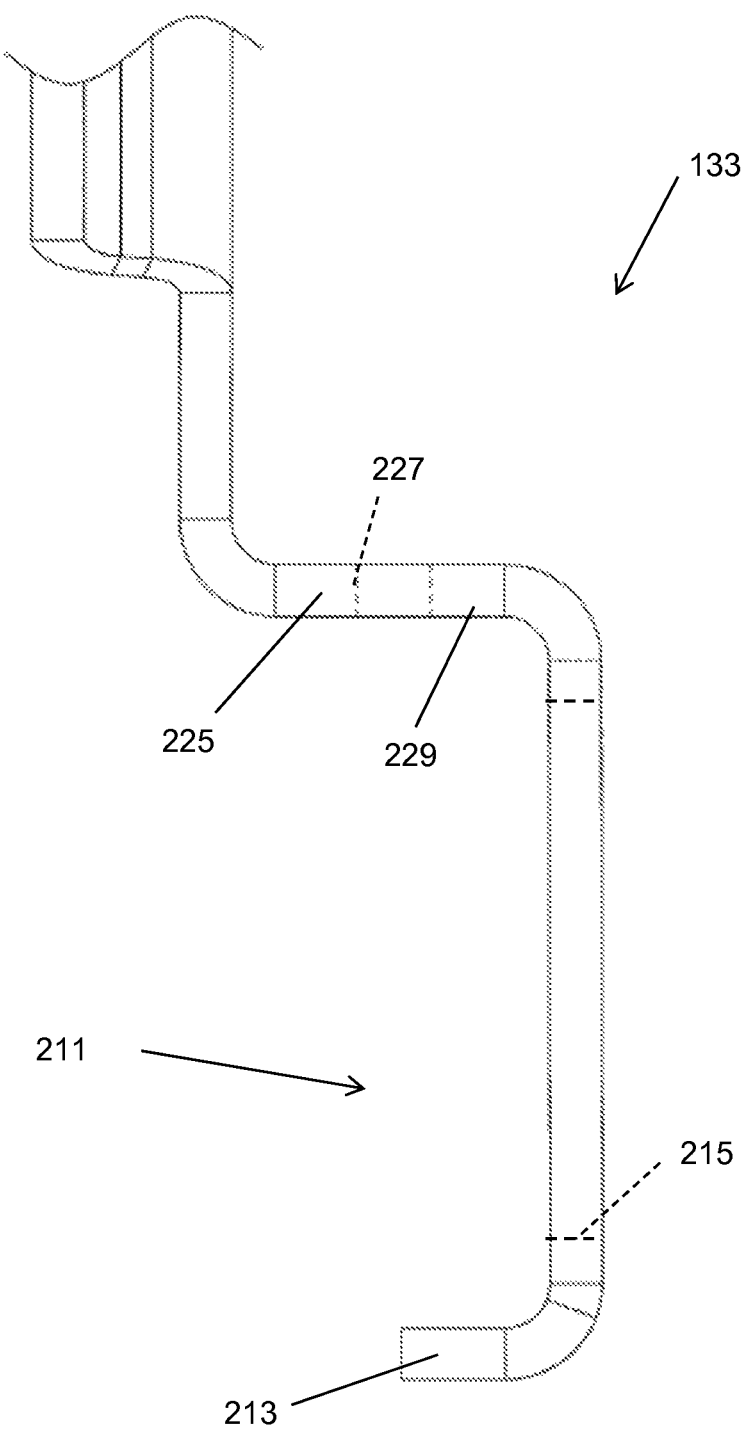
FIG. 7 is an enlarged fragmentary side elevation of the mechanical interface illustrated in FIG. 6.
Figure 8A:
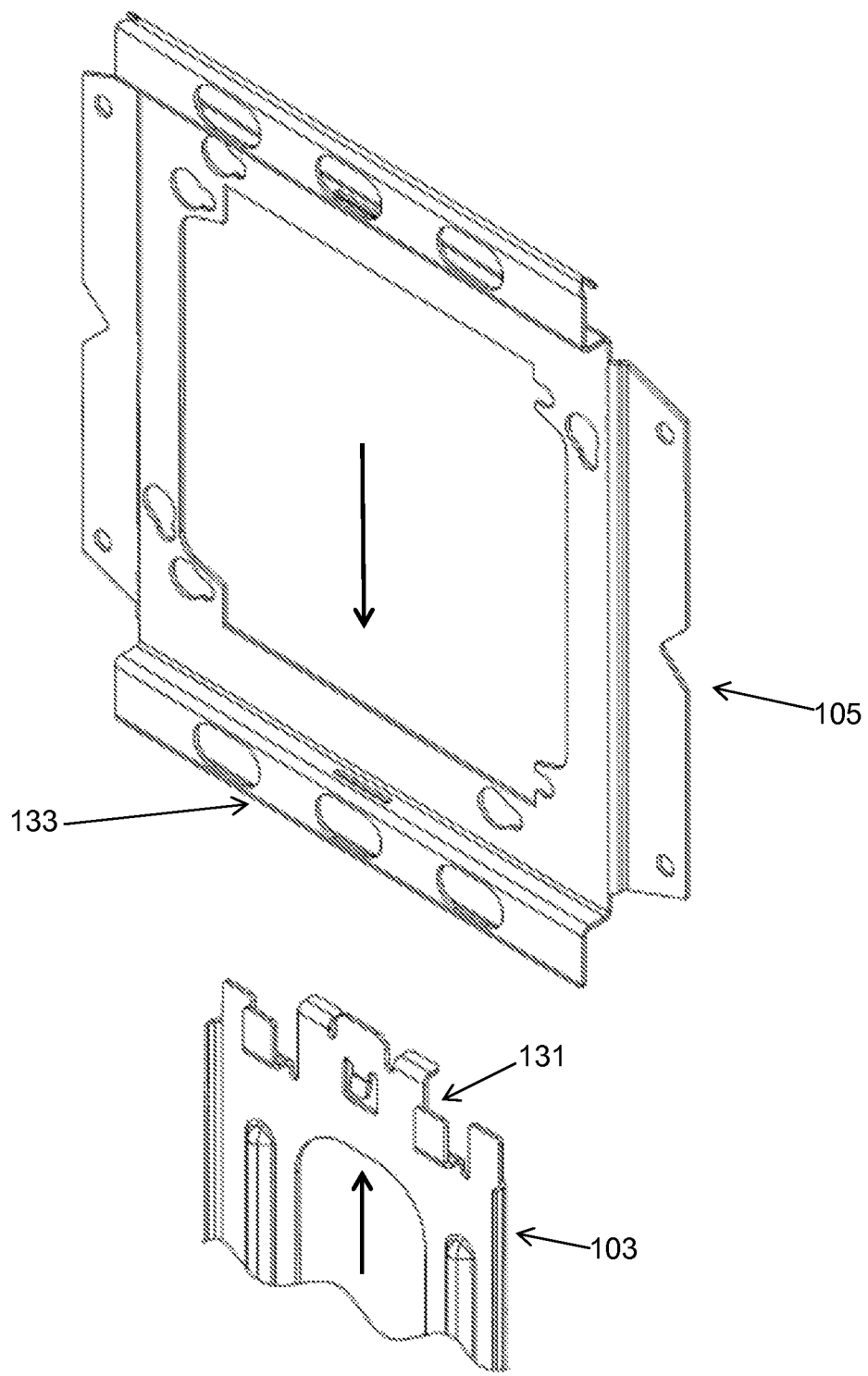
FIGS. 8A-8C are enlarged fragmentary perspectives illustrated in a sequence in which two different components of the floor support system illustrated in FIG. 1 are connected to one another.
Figure 8B:
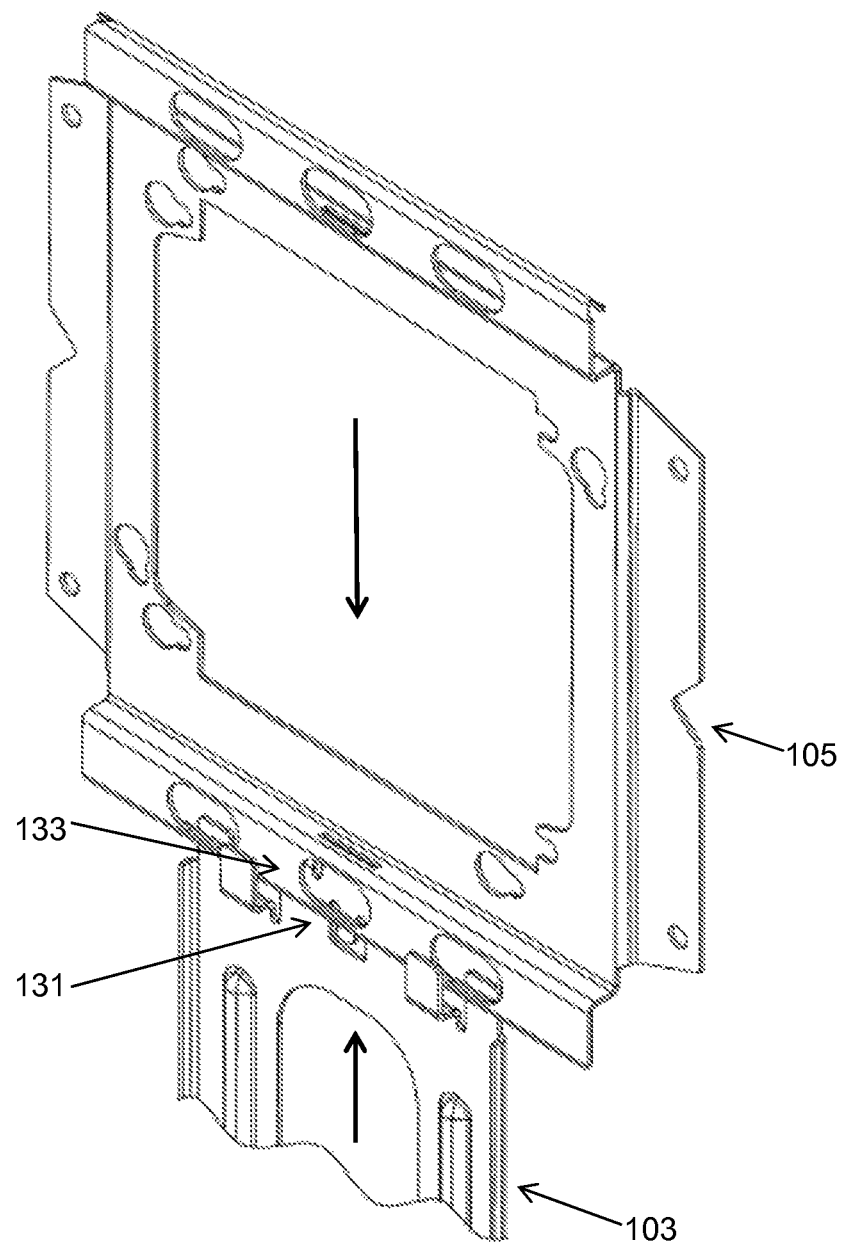
Figure 8C:
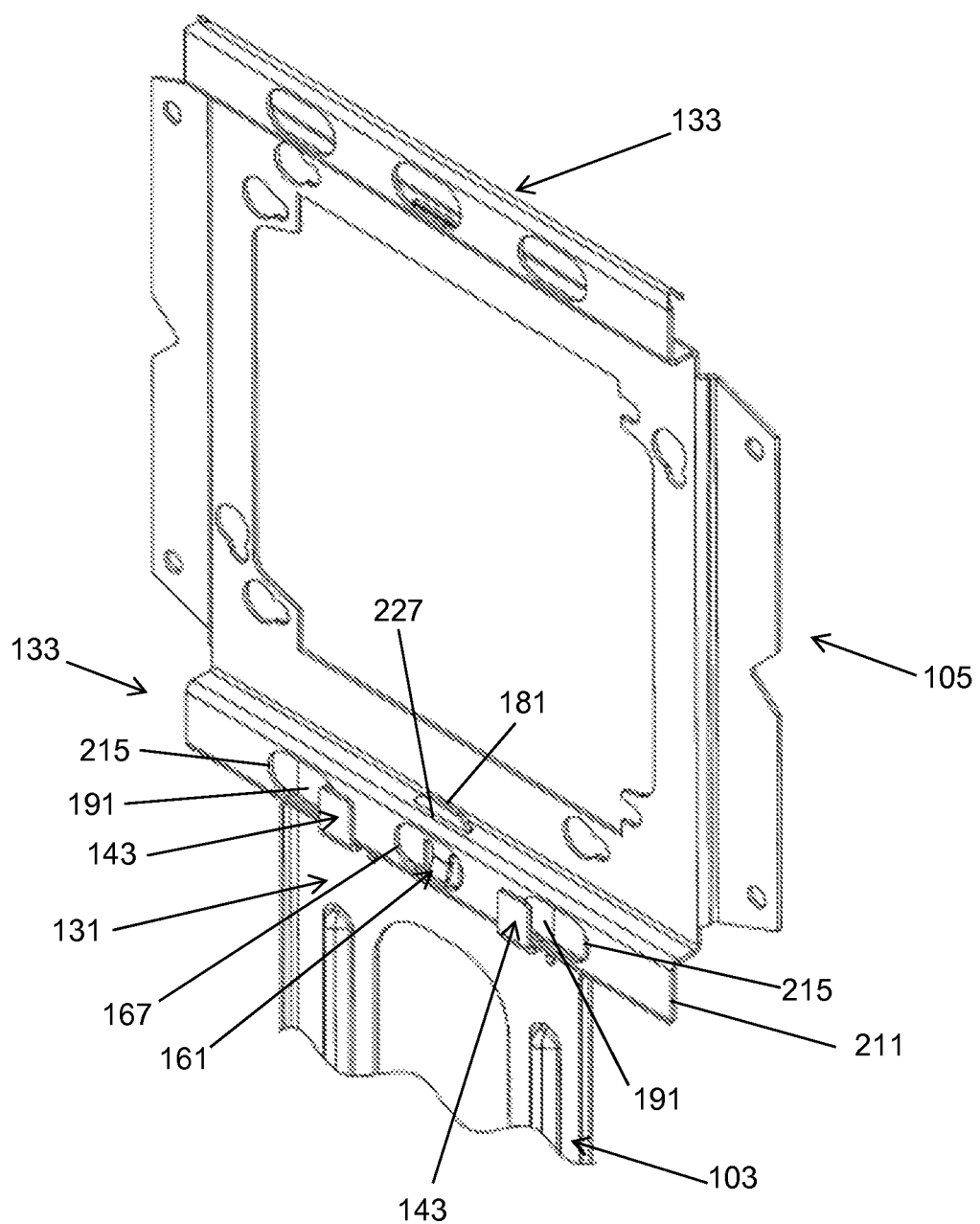
Figure 8D:
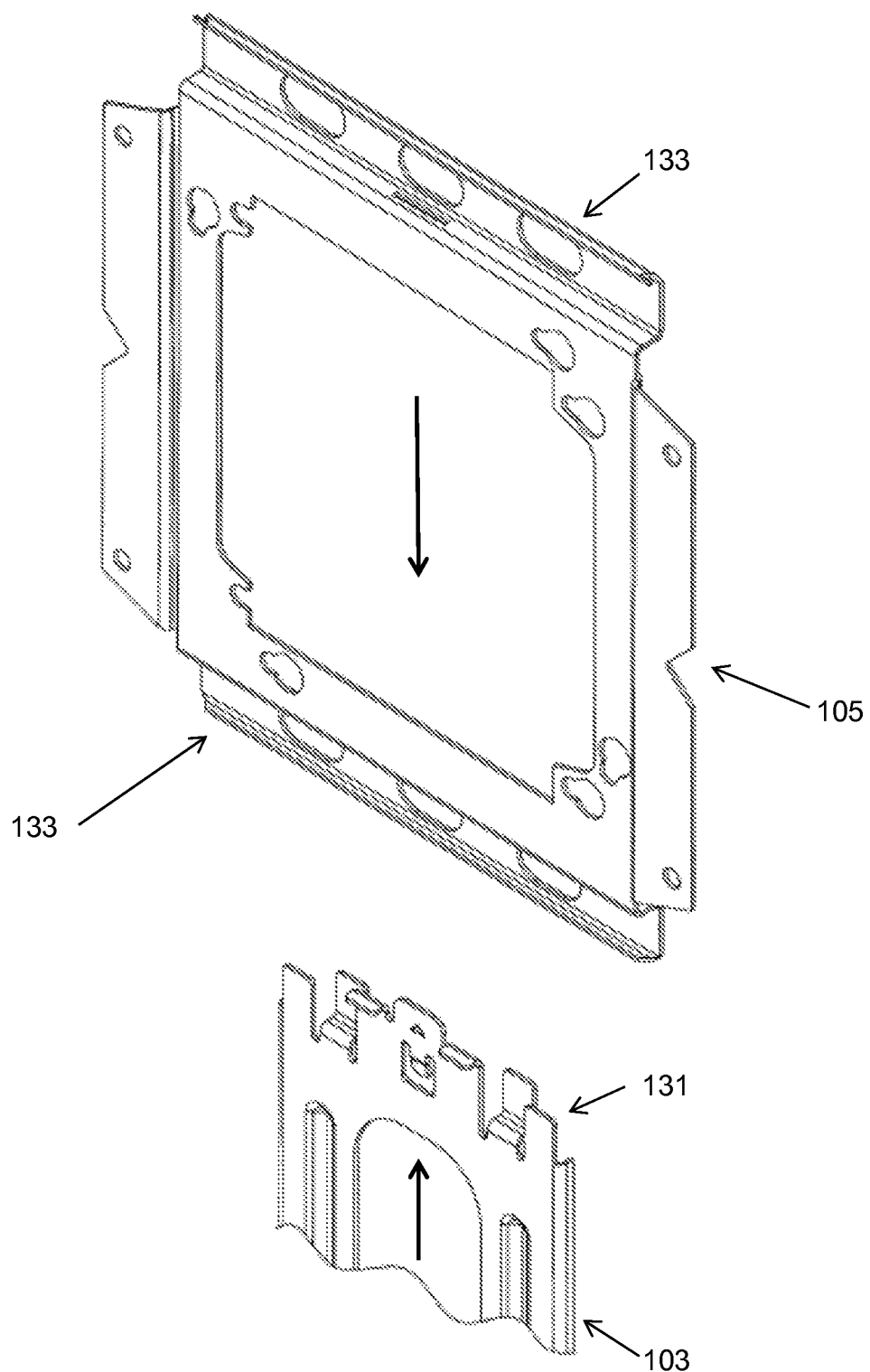
FIGS. 8D-8F are enlarged fragmentary perspectives similar to FIGS. 8A-8C but illustrating the sequence from a different vantage point.
Figure 8E:
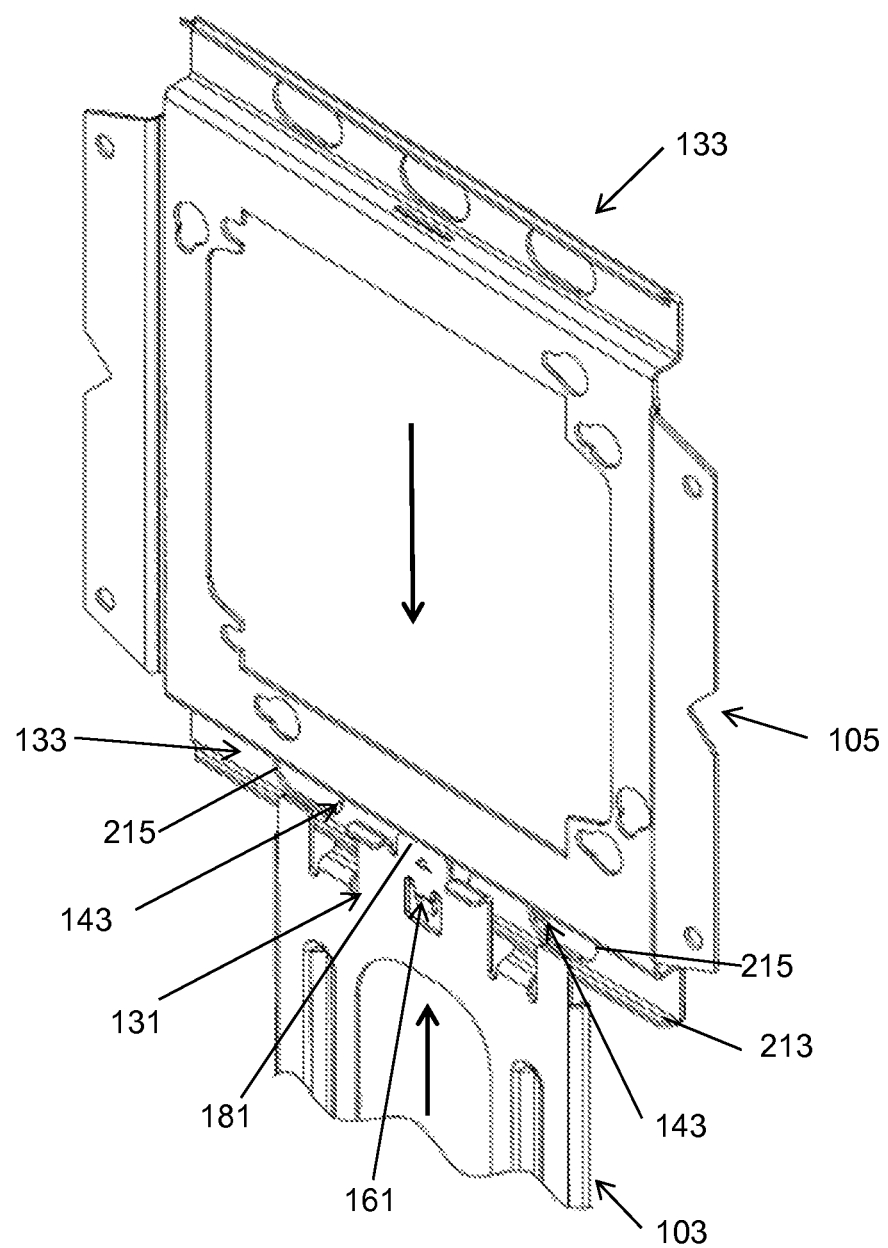
Figure 8F:
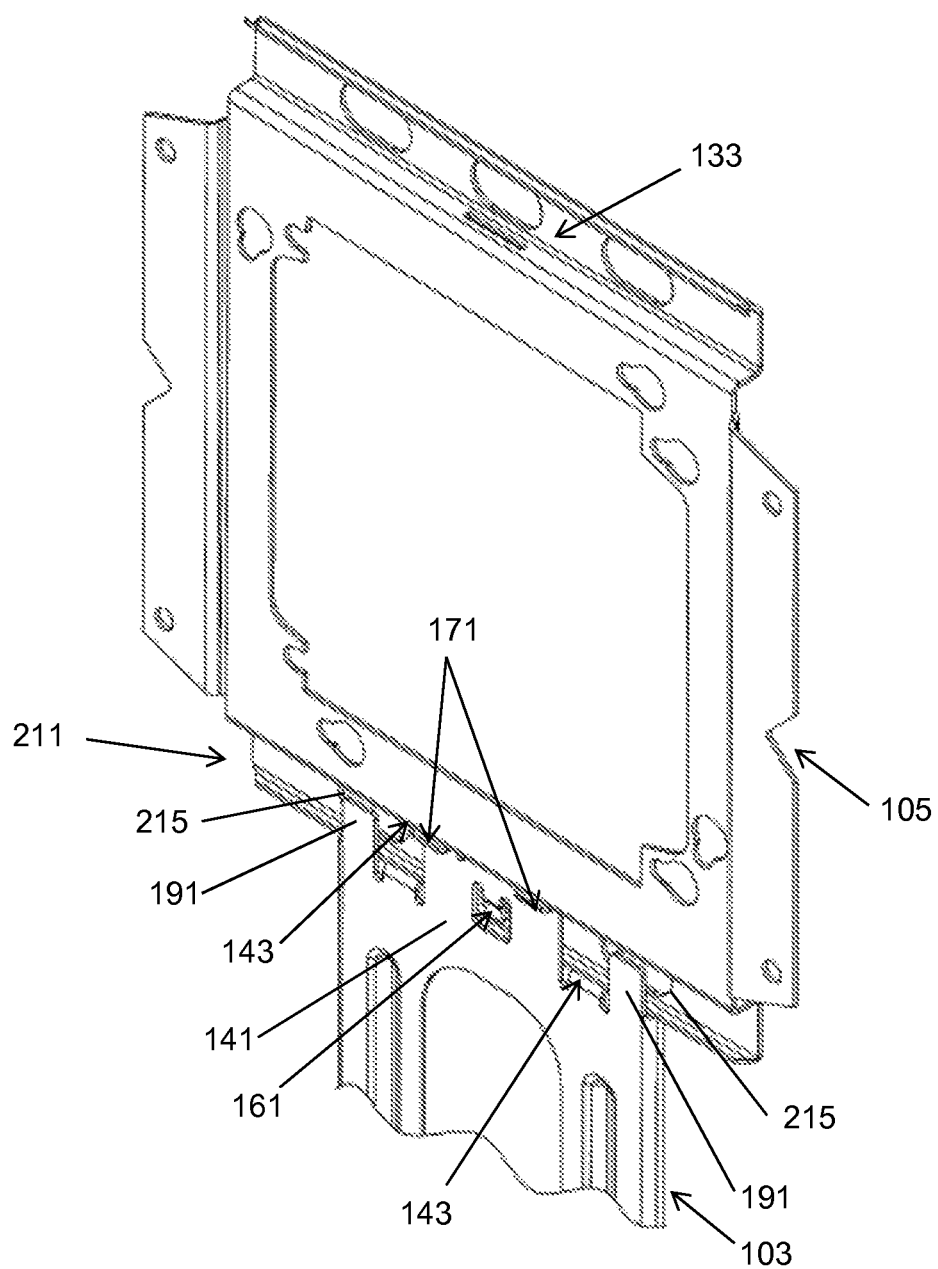
Figure 8G:
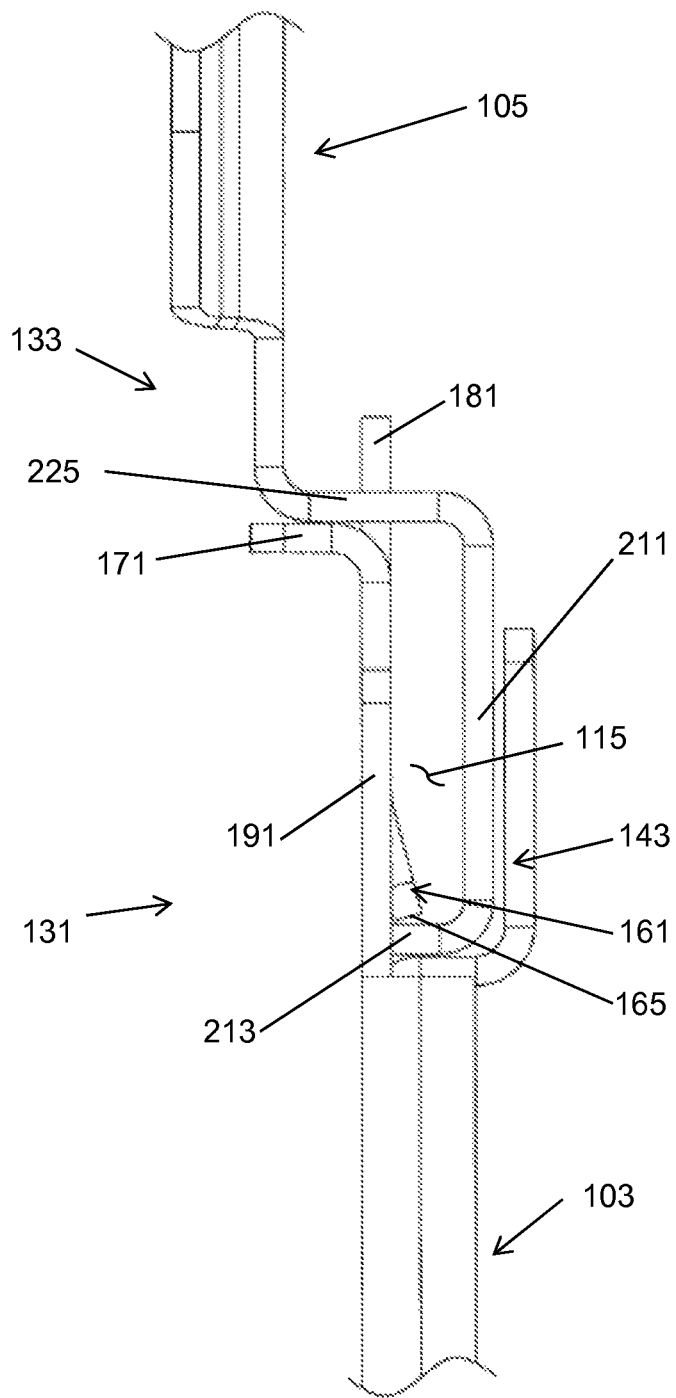
FIG. 8G is an enlarged fragmentary side elevation of the components after they have been connected according to the sequences in FIGS. 8A-8F.

Referring to FIGS. 6 and 7, the mating interface 133 has an end margin 211 that is shaped to be received in the channel 151. For example, in the illustrated embodiment the end margin 211 is generally straight for being received in a generally straight channel 151. A rib 213 is suitably formed along the end margin 211 (e.g., by bending a short segment at the end of the interface to a substantially orthogonal orientation relative to the rest of the end margin) to help resist accidental bending of the end of the interface 133 and to provide a structure that is positioned to catch the end 165 of the locking tab 161, as illustrated in FIG. 8G. A plurality of openings 167, 215 are positioned along the end margin 211. The openings 167, 215 suitably extend all the way through the interface 133 from one side to the other. One of the openings 167 is positioned to be in registration with the locking tab 161 when the interfaces 131, 133 are connected. The other openings 215 at positioned to be in registration with the tabs 191 when the interfaces 131, 133 are connected. In addition to the tabs 191, the sides of the fingers 143 are partially aligned with the openings 215 when the interfaces 131, 133 are connected so at least a portion of each finger 143 is visible through a corresponding opening. In the illustrated embodiment, for example, a central one of the openings 167 is positioned on a central axis 221 of the interface 133 and of the electrical box mount 105 between two other openings 215 for the tabs 191 and sides of the fingers 143. However, the number of openings can vary within the broad scope of the invention. Moreover, one or all of the openings 215 that are positioned in registration with the tabs 191 may be omitted within the scope of the invention.

The interface 133 in the illustrated embodiment also includes a shoulder 225 for abutting the stops 171. For example, the shoulder 225 suitably includes a substantially flat abutting surface 229 extending from the end of the interface 133 at an angle corresponding to the angle of the abutting surfaces 173 on the stops 171. For example, the abutting surface 229 suitably extends substantially orthogonally from the end margin 211 for abutting against surfaces 173 on the stops 171 that extend substantially orthogonally from the body 141 of the mating interface 131. The shoulder 225 suitably has a slot 227 therein for receiving the tongue 181. The slot 227 is suitably an elongate opening having a size and shape corresponding to the tongue 181. The shoulder 225 and slot 227 are suitably positioned so the openings 215 and the rib 213 are closer to the edge of the interface 133 than the shoulder and the slot therein.

As illustrated in FIGS. 8A-8G, the interfaces 131, 133 can be connected to one another by moving them toward one another in the direction of the arrows until the tongue 181 is received in the slot 227. As the interfaces 131, 133 are moved toward one another, the end margin 211 is received in the channel 151. The end margin 211 (e.g., the rib 213) resiliently deforms the locking tab 161 as it begins to move into the channel. Further movement of the interfaces 131, 133 toward one another brings the openings 167 into registration with the end 165 of the locking tab 161. At this point, elastic restoration forces in the locking tab 161 extend the free end 165 of the locking tab into the opening 167 and also back into the channel, as illustrated in FIG. 8G. Once the free end 165 of the locking tab 161 is in the opening 167 and channel 151, any attempt to separate the interfaces 131, 133 will be resisted by the locking tab because the free end of the locking tab will catch on the end margin 211 and limit the ability to move the interfaces 131, 133 away from one another. As illustrated in FIG. 8G, for instance, the locking tab 161 is suitably caught on the rib 213 on the end margin 211 of the interface 133.

The stops 171 and shoulder 225 limit the extent to which the interfaces 131, 133 may be moved toward one another. This provides solid support for one of the interfaces 131, 133 at a fixed elevation relative to the other (e.g., so the electrical box mount 105 is supported at a specific elevation above the floor by the floor support 103). They also help limit the risk of disengagement of the locking tab 161 by over insertion of the locking tab past the opening 215, which could result in the free end 165 of the locking tab being pushed out of the channel 151 by the upper edge of the opening to a position that would permit lateral movement of the locking tab around the opening without moving the locking tab into registration with the opening.

The extension of the tongue 181 into the slot 227 provides additional protection against lateral movement of the locking tab 161 out of the opening. The connection between the tongue 181 and the slot 227 also helps limit rotation of the interfaces 131, 133 (and the components they are on) relative to one another about an axis coinciding with the bottom of the channel 151 by securing the interfaces 131, 133 to one another at a location that is spaced from the bottom of the channel and therefore spaced from the axis. Accordingly, the interfaces 131, 133 are securely connected to one another and the possibility of unintended disconnection of the interfaces is remote.

The openings 215 along the end margin 211 of the interface facilitate verification of proper connection of the interfaces 131, 133 by a worker in the field because they allow the worker to see components of interface 131 that are on the opposite side from the worker. For example, when the worker is positioned on the side of the interfaces 131, 133 opposite the fingers 143, the openings 215 that are in registration with the fingers suitably allow the worker to see at least the side edges the fingers to confirm they are in their proper positions. When positioned on this side, the worker can also see that the tongue 181 is properly received in the slot 227. Moreover, the worker can see from this side of the interfaces 131, 133 that the end 165 of the locking tab 161 has extended into the opening 167 that is in registration with it into its locking position. The worker can also see the abutment between the stops 171 and shoulder 225 from this same side. Accordingly, the interfaces 131, 133 allow a worker to visually confirm that all of the fingers 143, the tongue 181, the locking tab 161, and the abutting surfaces 173, 229 of the stops 171 and shoulder 225 are properly positioned by a quick visual inspection of just one side of the interfaces 131, 133. Moreover, no tools are required for the worker to connect the interfaces 131, 133. The openings 215 also allow access to the electrical box to facilitate wiring.

The cable guide 113 is suitably connected to the electrical box mount 105 in substantially the same manner.

Once the floor support 103 is connected to the electrical box mount, the floor support and electrical box mount are suitably used to mount an electrical box (not shown) within a wall (not shown), for example, as generally described in U.S. Pat. No. 7,956,285, the contents of which are hereby incorporated by reference.

Figure 9:
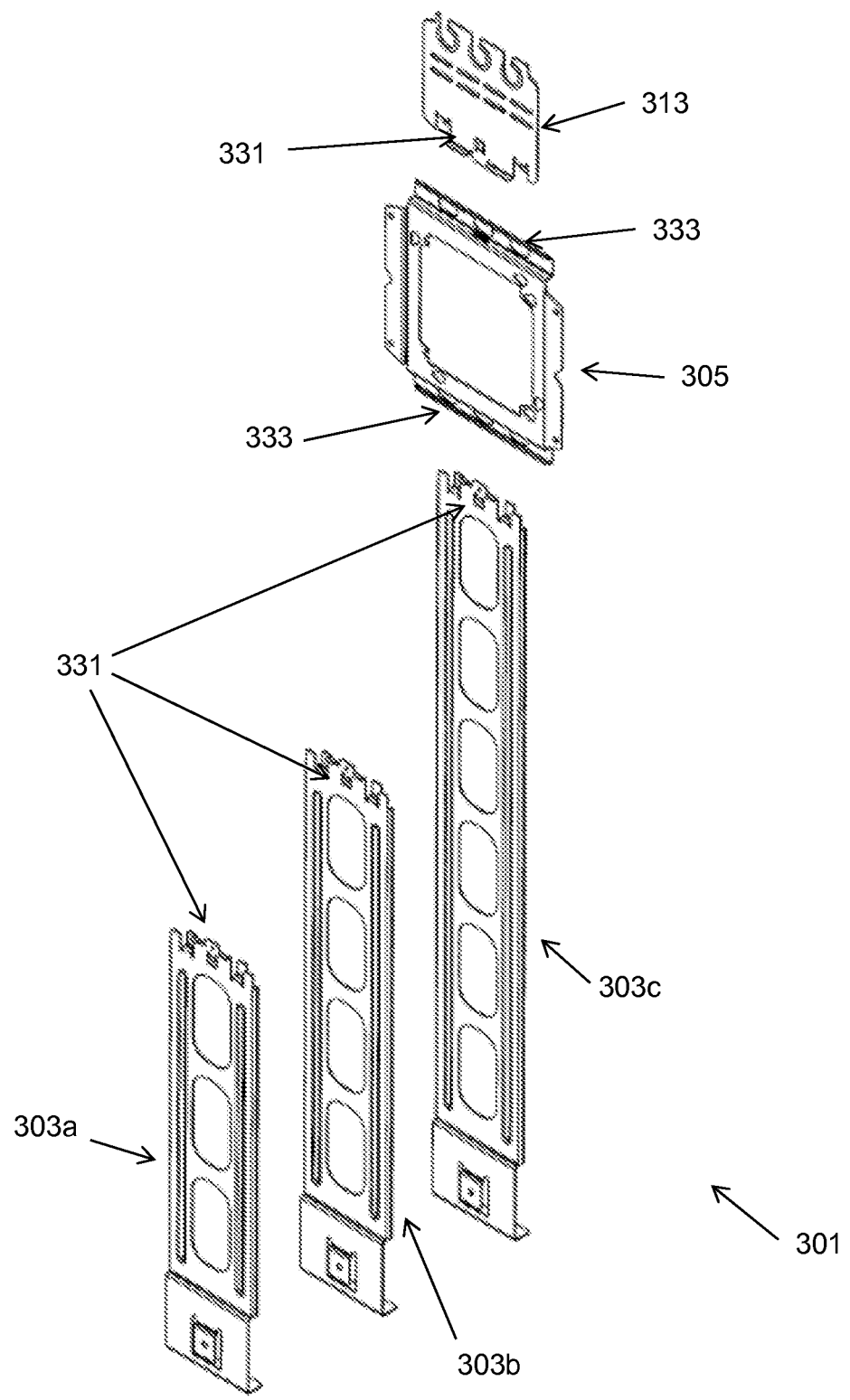
FIG. 9 is a perspective of another embodiment of a floor support system for mounting an electrical box in a wall at a selected elevation above the floor.
Figure 10:
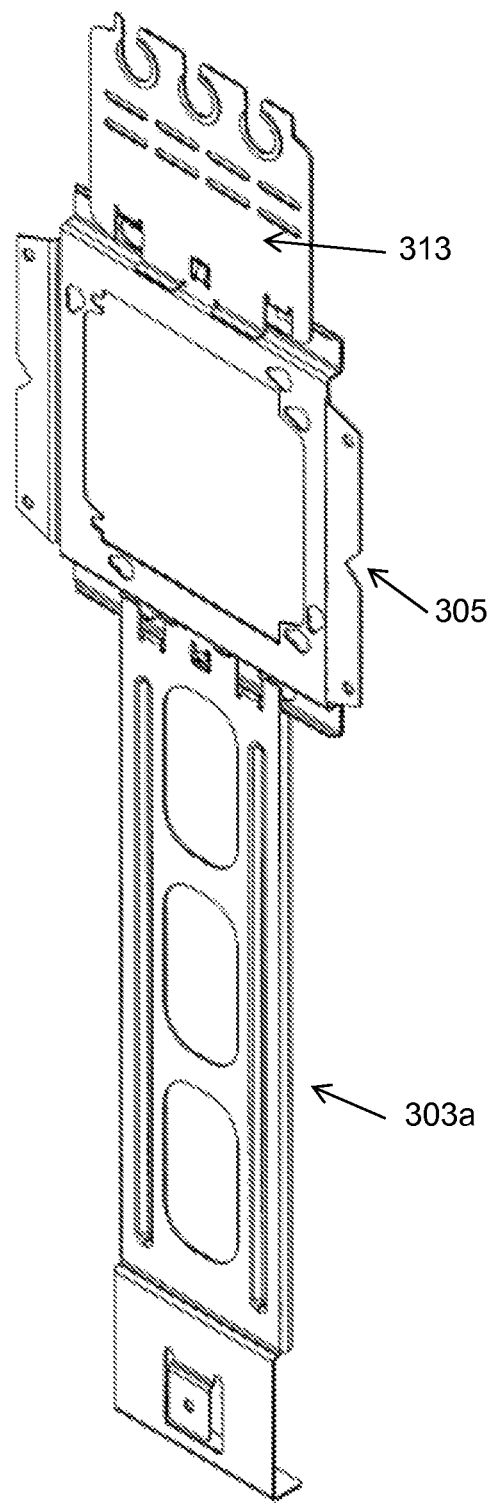
FIG. 10 is a perspective of the floor support system of FIG. 9 in a first configuration for mounting an electrical box at a relatively lower elevation above the floor.
Figure 11:
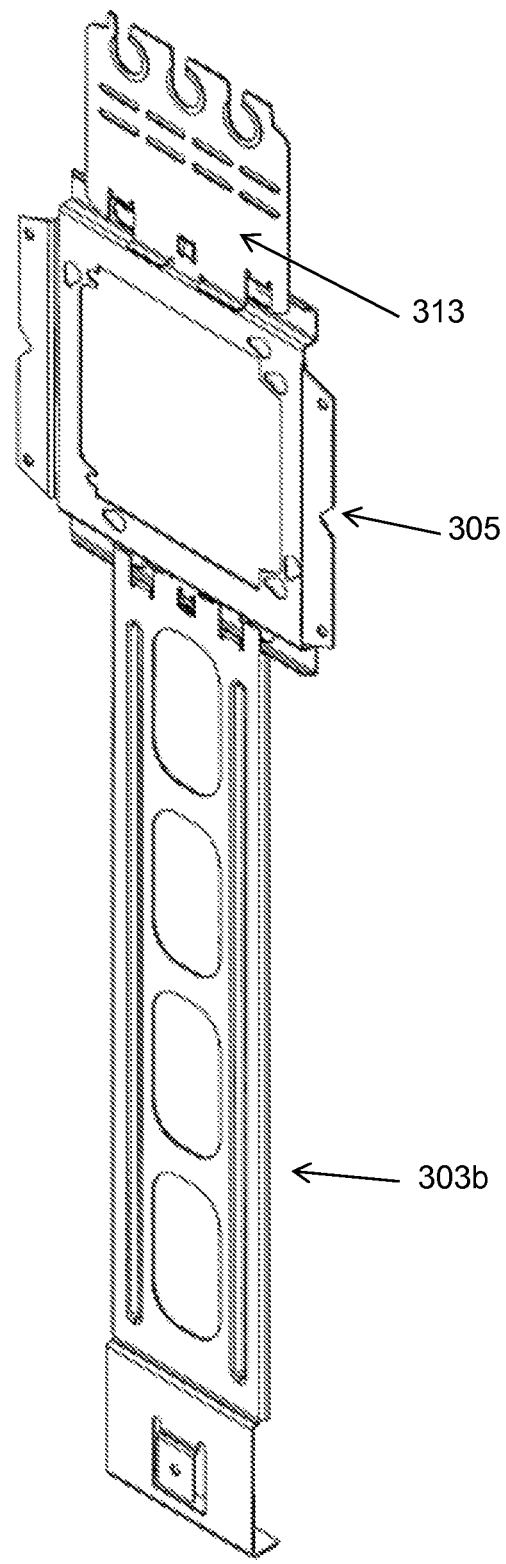
FIG. 11 is a perspective of the floor support system of FIG. 9 in a second configuration for mounting an electrical box at a relatively higher elevation above the floor.

Referring now to FIGS. 9-11, another embodiment of a floor support system for an electrical box is generally designated 301. This floor support system 301 is suitably substantially identical to the floor support system 101 described above except as indicated. The system has a cable guide 313 that is substantially identical to the cable guide 113 described above and an electrical box mount 305 that is substantially identical to the mount 105 described above. Instead of a single floor support 103, the floor support system 301 in FIGS. 9-11 includes a set of interchangeable floor supports 303a, 303b, 303c. Each floor support 303a, 303b, 303c is substantially identical to the floor support 103 described above except at least two of the floor supports have a length different from the floor support described above. Each of the floor supports 303a, 303b, 303c has a different length for supporting the electrical box mount 305 at a different elevation above the floor. In the illustrated embodiment, there are three floor supports 303a, 303b, 303c in the set, but the number of floor supports in the set can vary within the scope of the invention. Each floor support 303a, 303b, 303c suitably has a mechanical interface adapted to connect with an interface on the electrical box mount 305. For example, each floor support 303a, 303b, 303c suitably has an interface 331 that is substantially identical to the interface 131 described in detail above and the electrical box support 305 has interfaces 333 that are substantially identical to the interface 133 described above. Again, the positions of the interfaces 331, 333 can be reversed within the scope of the invention. Other interfaces different from the interfaces 331, 333 can also be used without departing from the broad scope of the invention. Moreover, it is not required that the interfaces on each floor support in the set be identical as long as each of the floor supports has an interface that is suitable for connection to the corresponding interface on the electrical box mount. The floor supports 303a, 303b, 303c are interchangeable because any one of them can be connected to the electrical box mount 305 to support the electrical box mount above the floor.

As noted, the floor supports 303a, 303b, 303c in the set are suitably substantially similar to one another except that they are each a different length and are adapted to support the electrical box mount 305 at a different elevation above the floor. For example, one of the floor supports 303a has a relatively shorter length, another of the floor supports 303c has relatively longer length, and a third floor support 303b has a length intermediate the lengths of the other two floor supports 303a, 303c. Building codes commonly require electrical boxes to be mounted at one of a limited number of elevations above the floor. For example, some current building codes require electrical boxes to be mounted at either 15 inches above the floor, 18 inches above the floor, or 24 inches above the floor. One of the floor supports 303a suitably has a length selected so the electrical box mount is supported at 15 inches above the floor when it is connected to that particular floor support. Another of the floor supports 303b suitably has a length selected so the electrical mounting box 305 is supported at 18 inches above the floor when it is connected to the floor support. The third floor support 303c suitably has a length selected so the electrical mounting box 305 is supported at 24 inches above the floor when it is connected to the floor support.

The number of floor supports in a particular set 303 and the different lengths thereof can vary as may be desired to provide various different combinations of options for mounting height of the electrical box. For example, one set of floor supports may include only 2 floor supports having two different lengths for providing two different options for the elevation of the electrical box. Another set of floor supports may include 4 or more floor supports each having a unique length for providing a corresponding number of options for the elevation of the electrical box. For example, different jurisdictions may have different building codes and/or different manufacturers may have different practices concerning the different standard elevations at which they mount electrical boxes and a suitable set of floor supports having lengths corresponding to the different standardized options for elevations of an electrical box can be manufactured.

To install an electrical box using the floor support system 301, a worker selects one of the floor supports 303a, 303b, 303c corresponding to a desired mounting height for an electrical box. The worker connects the selected floor support 303a, 303b, or 303c to the electrical box mount 305 using the interfaces 331, 333 in the manner described above and installs them in the wall so the floor support is anchored to the floor at its bottom end opposite the electrical box mount 305 and the electrical box mount is supported at the correct elevation. The non-selected floor supports 303a, 303b, 303c are suitably re-used in another substantially identical system 301. For example, a worker may access a collection of floor supports on a job-site that includes several different short floor supports 303a, several different medium height floor supports 303b, and several different tall floor supports 303c. The worker selects the appropriate floor support 303a, 303b, or 303c to suit the needs of a particular electrical box installation from the set.

Each time a system 301 is used, one of the floor supports 303a, 303b, or 303c will be selected and the remainder will be unselected, thereby breaking up the set of floor supports. However, once the selection is made, the selected floor support can be replaced with another floor support having the same length so there is once again a system 301 including a complete set of floor supports available for the next electrical box installation. For example, the collection of floor supports 303a, 303b, 303c can be stored on a rack (not shown) or other suitable storage device or system. Optionally, a collection of electrical box mounts 305 and/or cable guides 313 can be included in the collection of floor supports (e.g., stored in the same rack or other storage system). Normally, the number of electrical box mounts 305 at the job site will be depleted more rapidly than numbers of the individual floor supports 303a, 303b, 303c because each new installation will likely use one electrical box mount 305 and only one of the possible floor supports. Appropriate inventories of each type of floor support 303a, 303b, 303c can be provided by studying the distribution of the various heights at which electrical boxes are to be mounted according to the building plans and/or tracking use of inventory to re-supply the worker and/or job site with a number of each type of floor support generally corresponding to the number of that type of floor support that has been selected for use in an installation. Moreover, the amount of space on a job-site or in a warehouse that needs to be dedicated to products for installing electrical boxes at a particular height can be reduced using the system 301. Because the floor supports 303a, 303b, 303c have fixed lengths and no telescoping segments, less material is required to mount a plurality of electrical boxes at different heights using the system 301 described herein than is required in some conventional telescoping floor support systems.

Figure 12:
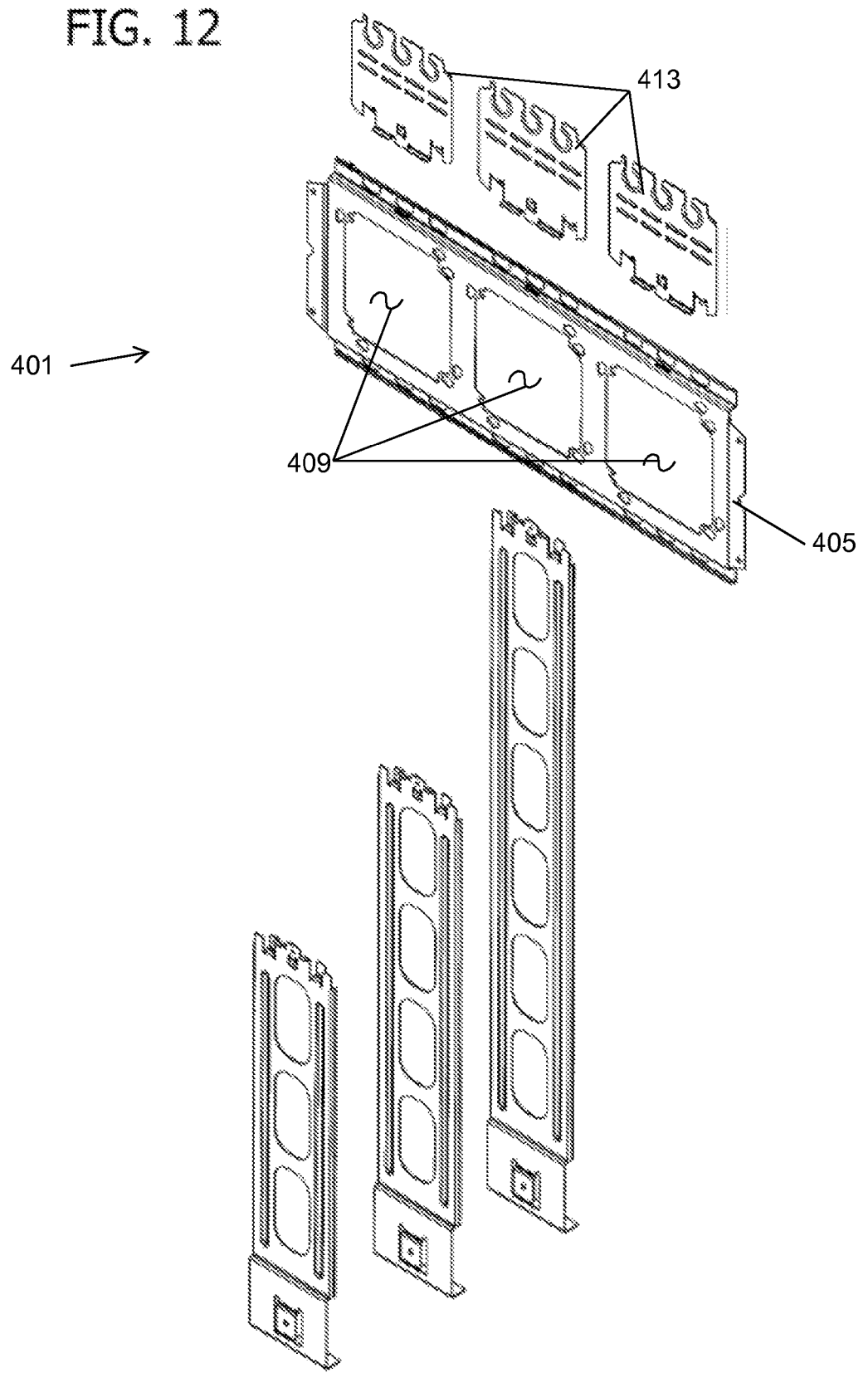
FIG. 12 is a perspective of another embodiment of a floor support system.

Another embodiment of a floor support system, generally designated 401, is illustrated in FIG. 12. The floor support system 401 is substantially identical to the systems 101, 301 described above except that the electrical box mount 405 has multiple openings 409 for receiving a corresponding number of electrical boxes (not shown). For example, in the embodiment illustrated in FIG. 12 the electrical box mount 405 has three openings for receiving three different electrical boxes. The system 401 suitably includes a cable guide 413 for each electrical box.

The floor supports, electrical box mounts, and cable guides, including the interfaces described herein can each suitably be manufactured by stamping a blank from a flat sheet of metal or other suitable material and forming the flat blank to give it the final shape of the respective component. Moreover, the blanks for the cable guides can be cut from the same sheet of material as the electrical box mounts by cutting the blanks from the material corresponding to the openings for receiving the electrical boxes. For example, a pattern for making three cable guides from the material cut from the openings for the three electrical boxes in the blank for the electrical box mount 405 may be provided. This pattern can readily be adapted to provide a number of cable guides corresponding to the number of electrical boxes that an electrical mounting box is adapted to support from entirely within the footprint of the pattern for the electrical mounting box on the flat sheet of metal or other material. This advantageously reduces waste of material.

When introducing elements of the ring binder mechanisms herein, the articles "a", "an", "the" and "said" are intended to mean that there are one or more of the elements. The terms "comprising", "including" and "having" and variations thereof are intended to be inclusive and mean that there may be additional elements other than the listed elements. Moreover, the use of "forward" and "rearward" and variations of these terms, or the use of other directional and orientation terms, is made for convenience, but does not require any particular orientation of the components.

As various changes could be made in the above without departing from the scope of the invention, it is intended that all matter contained in the above description and shown in the accompanying drawings shall be interpreted as illustrative and not in a limiting sense.

What is claimed is:

1. A floor stand system for mounting an electrical box above a floor, the system comprising:
   an electrical box mount configured to attach to and support one or more electrical boxes, the electrical box mount including
      a face plate having opposite upper and lower ends, and opposite front and back faces, wherein the face plate is configured to mount the one or more electrical boxes to the back face of the electrical box mount,
      a lower mechanical interface at the lower end of the face plate, wherein the mechanical interface defines a lower horizontal channel including an upper wall projecting rearward from the face plate, a rear wall extending downward from a rear end of the upper wall, and a lower wall projecting forward from a lower end of the rear wall and generally opposing the upper wall, and
      an upper mechanical interface at the upper end of the face plate, wherein the upper mechanical interface defines an upper horizontal channel including a lower wall projecting rearward from the face plate, a rear wall extending upward from a rear end of the lower wall, and an upper wall projecting forward from an upper end of the rear wall and generally opposing the lower wall;
   a floor support having a first mating mechanical interface at an upper end of the floor support, the first mating mechanical interface being adapted to connect to the lower horizontal channel of the electrical box mount to secure the electrical box mount to the floor support, wherein the floor support is configured to support the electrical box mount at a desired elevation above the floor when the floor support is secured to the electrical box mount; and
   a cable guide having a second mating mechanical interface at a lower end of the cable guide, the second mating mechanical interface adapted to connect to the upper horizontal channel of the electrical box mount to secure the cable guide to the electrical box mount, the cable guide being configured for supporting one or more cables connected to an electrical box mounted on the electrical box mount at a position spaced from the electrical box.

2. A floor stand system as set forth in claim 1 wherein the electrical box mount defines a central opening and a plurality of perimeter openings adjacent a perimeter of the central opening.

3. A floor stand system as set forth in claim 1 wherein the first mechanical interface of the floor support includes a resiliently deflectable first locking tab configured to enter the lower horizontal channel of the electrical box mount to facilitate connection of the floor support to the electrical box mount,
   wherein the second mechanical interface of the cable guide includes a resiliently deflectable second locking tab configured to enter the upper horizontal channel of the electrical box mount to facilitate connection of the cable guide to the electrical box mount.

4. A floor stand system as set forth in claim 1 wherein the upper wall of the lower horizontal channel defines a first tongue-receiving slot, wherein the first mechanical interface of the floor support includes a first tongue at an upper end thereof configured to enter the first tongue-receiving slot to facilitate connection of the floor support to the electrical box mount,
   wherein the lower wall of the upper horizontal channel defines a tongue-receiving slot, wherein the second mechanical interface of the floor support includes a tongue at a lower end thereof configured to enter the second tongue-receiving slot to facilitate connection of the cable guide to the electrical box mount.

5. A floor stand system as set forth in claim 4 wherein the first mechanical interface of the floor support includes at least one first finger extending upward and at least one first tab extending upward, wherein the at least one first finger and at least one first tab defines a first interface horizontal channel configured to receive the lower horizontal channel of the electrical box mount therein,
   wherein the second mechanical interface of the cable guide includes at least one second finger extending upward and at least one second tab extending upward, wherein the at least one second finger and at least one second tab defines a second interface horizontal channel configured to receive the upper horizontal channel of the electrical box mount therein.

6. A floor stand system for mounting an electrical box above a floor, the system comprising:
   an electrical box mount configured to attach to and support one or more electrical boxes, the electrical box mount including
      a face plate having opposite upper and lower ends, and opposite front and back faces, wherein the face plate is configured to mount the one or more electrical boxes to the back face of the electrical box mount, and
      a mechanical interface at the lower end of the face plate, wherein the mechanical interface defines a horizontal channel including an upper wall projecting rearward from the face plate, a rear wall extending downward from a rear end of the upper wall, and a lower wall projecting forward from a lower end of the rear wall and generally opposing the upper wall, wherein the upper wall of the horizontal channel defines a tongue-receiving slot;
   a floor support having a mating mechanical interface at an upper end of the floor support, the mating mechanical interface being adapted to connect to the horizontal channel of the electrical box mount, without the use of any tools, to secure the electrical box mount to the floor support, without the use of any tools, wherein the mechanical interface of the floor support includes a tongue at an upper end thereof configured to enter the tongue-receiving slot to facilitate connection of the floor support to the electrical box mount,
   wherein the floor support is configured to support the electrical box mount at a desired elevation above the floor when the floor support is secured to the electrical box mount.

7. A floor stand system as set forth in claim 1 further comprising a cable guide having a lower end adapted to connect to the electrical box mount to secure the cable guide to the electrical box mount, the cable guide being configured for supporting one or more cables connected to an electrical box mounted on the electrical box mount at a position spaced from the electrical box.

8. A floor stand system as set forth in claim 1 wherein the electrical box mount is adapted to support a plurality of electrical boxes.

9. A floor stand system as set forth in claim 1 wherein the electrical box mount defines a central opening and a plurality of perimeter openings adjacent a perimeter of the central opening.

10. A floor stand system as set forth in claim 1 wherein the mechanical interface of the floor support includes a resiliently deflectable locking tab configured to enter the horizontal channel to facilitate connection of the floor support to the electrical box mount.

11. A floor stand system as set forth in claim 1 wherein the mechanical interface of the floor support includes at least one finger extending upward and at least one tab extending upward, wherein the at least one finger and at least one tab defines a horizontal channel configured to receive the horizontal channel of the electrical box mount therein.

* * * * *